May 18, 1926.
C. K. FREER
FISH NET
Filed June 19, 1925
1,585,483
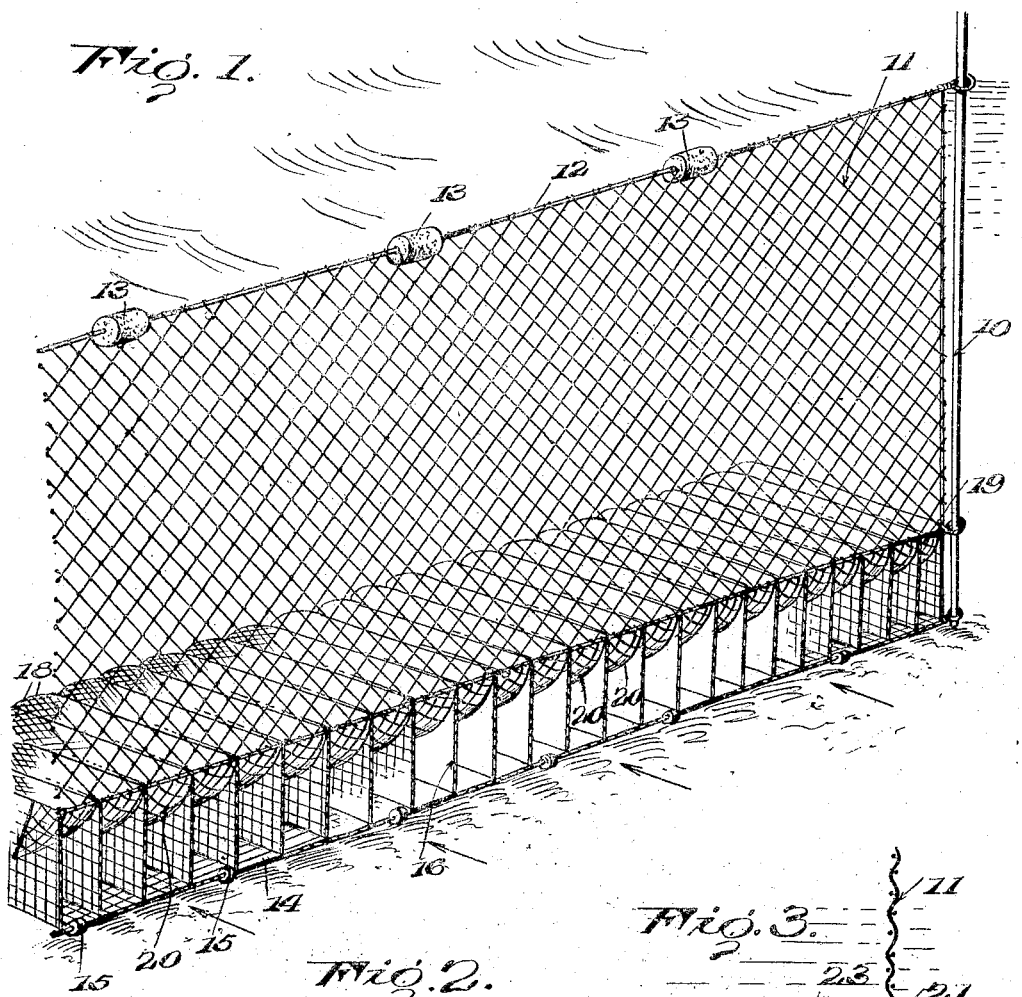
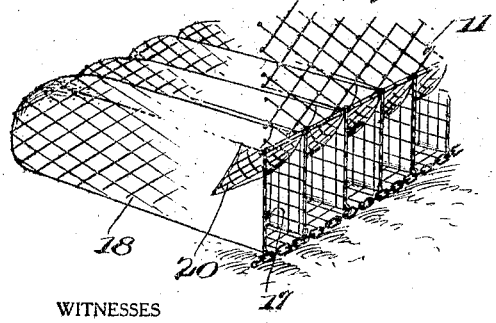
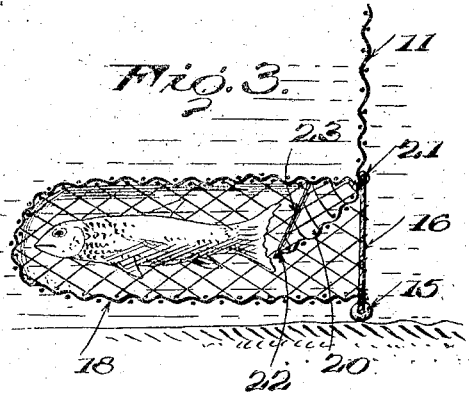
WITNESSES
INVENTOR
Charles K. Freer
BY
ATTORNEYS Patented May 18, 1926.

1,585,483

UNITED STATES PATENT OFFICE.

CHARLES KAATER FREER, OF TOLEDO, OHIO.

FISH NET.

Application filed June 19, 1925. Serial No. 38,271.

This invention relates to fish nets and has for its object the provision of a fabricated device adapted to be placed in a stream or body of water and across the path of a school of fish for trapping the fish in pockets which appear to afford a passage for the fish.

Another object of the invention is the provision of a net having a plurality of pockets at a predetermined height which are so constructed that they will permit entering but will prevent the escape of the fish.

A further object of the invention is the provision of net for trapping fish and in which a plurality of narrow pockets are formed having restricted entrances and hinged fabricated doors to permit fish to enter the pockets while the doors act as traps to prevent escape.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claim.

In the drawings:

Figure 1 is a view in perspective of a fish net and trap constructed according to the principles of my invention.

Figure 2 is a fragmentary view in perspective of the pockets which act as traps for the fish.

Figure 3 is a longitudinal sectional view of a pocket.

Referring more particularly to the drawings, 10 designates one of a pair of posts or anchors which are driven into the bed of a body of water. The posts are placed adjacent the banks so that when the net 11 is stretched between said posts and across the path of the travel of the fish the fish are prevented from progress. A cable 12 is fastened to the upper edge of the net and spaced buoys or cork floats 13 are connected to the cable in any approved manner to support the intermediate portions of the net near the level of the water and for retaining the cable in substantially a horizontal position. A second cable 14 is attached to the bottom of the net and is provided with spaced weights 15 to maintain the lower end of said net in close contact with the bed. Instead of the individual weights a chain the length of the net may be substituted for the purpose.

The lower end of the net is formed with a plurality of openings 16 registering with the entrances 17 of a plurality of pockets or traps 18. These entrances are approximately eight inches square but the dimensions may be varied to conform to different species or sizes of fish. The openings in the net are either located in spaced relation or a slot may be provided the length of the net and a cable 19 secured in place to the net at the upper edge of said slot as shown in Figure 1. The pockets are then placed in juxtaposition, with their open ends secured in the vertical plane of the net and at the opening formed by said slot.

The pockets are made of fabricated material to permit the admission of water and may be so constructed that they will have common side walls and individual top, bottom and end walls, or the top and bottom walls may for a continuation of the material. While one layer of pockets is shown, a plurality of rows may be employed if desired.

In order to prevent the escape of the fish after they have entered the pockets, a swinging trap door 20 made of fabricated material is hingedly connected to the upper front edge of the pocket adjacent the entrance to the pockets as shown at 21. The lower edge 22 of the doors are held in an elevated position to maintain the doors partially open so that a fish will be permitted to enter the pockets. One or more lanyards 23 is connected between the lower edge of the door and the top of the pocket for retaining the doors partially open. It is desirable to make the pockets approximately six to eight feet long in order to comfortably house the larger fish. When smaller fish are intended to be trapped the dimensions of the pockets are suitably reduced.

In the application of the device for trapping fish, the net is placed transversely of the path in a body of water and the posts or anchors 10 are driven into the bed to maintain the net taut. The floats 13 are adapted to position the cable or line 12 while the weights 15 or chain hold the bottom of the net to the bed of the body of water. As the fish reach the net they will seek an opening and as the entrance to the pocket presents an apparant avenue of escape the fish will enter the pockets and either by reason of the narrow passage which will prevent the fish from turning in the pockets or by reason of the partially closed doors, the fish will be trapped. By the removal of the net, the fish may be obtained at intervals.

What I claim is:

A fish net comprising a length of fabricated material, a cable secured to the upper edge thereof and provided with floats, a cable secured to the lower edge of the material and provided with weights, said material adjacent the lower end having openings, pockets formed of fabricated materials connected to the material and embracing the openings, each pocket having an entrance alining with an opening in the material, a trap door formed of fabricated material swingably connected to each pocket at an upper edge of the entrance to said pocket, a lanyard secured between the pocket and the lower edge of the door for maintaining said door partially open.

CHARLES KAATER FREER.